United States Patent
Park et al.

(10) Patent No.: US 6,258,921 B1
(45) Date of Patent: Jul. 10, 2001

(54) EASILY DYEABLE POLYESTER FILM AND PREPARATION THEREOF

(76) Inventors: Sang Bong Park, Hanyang Sujeong Apt 204-1403, Kwanum-dong 1370, Buk-ku, Daegu 702-240; Kyung Heum Han, Park mansion 107-602; Jong Chan Park, Kwibin Apt 101-606, both of Doryang-dong, both of Kumi-City, Kyungsangbuk-do 730-020, all of (KR)

( * ) Notice: Subject to any disclaimer, the term of this patent is extended or adjusted under 35 U.S.C. 154(b) by 0 days.

(21) Appl. No.: 08/989,211

(22) Filed: Dec. 11, 1997

(30) Foreign Application Priority Data

Dec. 11, 1996 (KR) .................................................. 96-64039

(51) Int. Cl.$^7$ .................................................. C08G 63/00
(52) U.S. Cl. ...................... 528/193; 427/38.4; 427/385.5; 428/34.1; 528/176
(58) Field of Search .................................... 528/176, 193; 427/38.4; 428/34.1

(56) References Cited

U.S. PATENT DOCUMENTS 5,458,965 * 10/1995 Yoshinaka et al. ................... 428/323

* cited by examiner

Primary Examiner—Terressa Mosley
(74) Attorney, Agent, or Firm—Duane, Morris & Heckscher LLP

(57) ABSTRACT

A double-axis elongated polyester film for dyeing which simultaneously satisfies following formulas:

$$3.295 \leq N_{MD} + N_{TD} \leq 3.340 \quad (1)$$

$$\text{Benzene plane orientation} \leq 0.740 \quad (2)$$

$$\text{Crystallinity (\%)} \leq 54 \quad (3)$$

$$3 \leq \text{Thermal shrinkage in machine direction(\%)} \leq 7 \quad (4)$$

$$0 \leq \text{Thermal shrinkage in transverse direction(\%)} \leq 3 \quad (5)$$

The polyester film is prepared by melt-extruding polyester chips and cooling the extrudate in a cooling drum to prepare a non-crystalline sheet; elongating said sheet at a temperature between 80 and 100° C. which is higher than glass transition temperature (Tg) to make 3.0 to 3.6 folds of length in machine direction to obtain single-axis elongated film; further elongating the film to 3.0–4.2 folds of length in transverse direction at 120–140° C.; thermally treating the obtained film in Tenter's thermal treatment zone at 210–240° C. with at least 5 stages; and rolling the double-axis elongated film obtained by releasing 0.01–10% of the film in machine and/or transverse direction. The film obtained above must satisfy both formulas (1) and (2).

7 Claims, No Drawings

EASILY DYEABLE POLYESTER FILM AND PREPARATION THEREOF

FIELD OF THE INVENTION

The present invention relates to easily dyeable polyester film and preparation thereof.

BACKGROUND OF THE INVENTION

Up to the present, the industrially produced polyester molded articles are widely used in various fibers, film and other molded products. Especially, polyester film prepared from aromatic dicarboxylic acid and glycol has excellent mechanical properties such as thermal resistance, anti-tensile strength, elongation, Young's modulus, recovery of elasticity and impact resistance, as well as dimension stability and electric insulating property, so that it is widely usable in various materials for industry and agriculture such as magnetic recording tape, photograph film, insulating material, film to be deposited. In addition, by virtue of its excellent chemical properties such as chemical resistance, weather resistance and water resistance as well as transparency, fragrance-retaining property and gas-tight property, the amount of use as packing materials for food or other goods is increasing.

Conventionally, the industrial process for preparation of polyester film comprises the steps of melt-extruding polyester chips and cooling the extrudate in a cooling drum to prepare a non-crystalline sheet; and elongating and thermally setting the sheet to obtain double-axis elongated film. According to a conventional industrial process for preparing the polyester chips used in the process for preparing polyester film, a dicarboxylic acid (for example, terephthalic acid) and a glycol (for example, ethylene glycol) are directly subjected to esterification by heating at a reaction temperature between 200–280° C., or a dimethylcarboxylate (for example, di methyl terephthalate) and a glycol (for example, ethylene glycol) are subjected to transesterification at a temperature between 140–240° C. in the presence of a catalyst to obtain bis(β-hydroxyethyl)terephthalate and/or low molecular weight condensate (esterified product) thereof, and the product is then heated at a reaction temperature between 260–300° C. in the presence of a polycondensation catalyst under high vacuum to perform a polycondensation, and the polyester polymer is then extruded into cooling water in the form of spaghetti, and the obtained product is cut in a certain length to give polyester chips.

Conventional polyester film, that is prepared by subjecting a series of film-forming process with polyester polymer obtained from aromatic dicarboxylic acid (or dimethylcarboxylate) and glycol, is industrially valuable due to excellent physical properties mentioned above, however, sometimes the application is rather restricted because it has few reactive groups owing to its molecular structure. In other words, polyester film has inferior adhesiveness, dyeability, hygroscopicity and anti-static property to those of polyamides, polyacetates or celluloses.

For improving such deficiencies of polyester film, in particular improper dyeability, various methods—such as adding a copolymeric component to aromatic polyester to form a copolymeric polyester, or incorporating a compound having good affinity to the dye to lower the crystallinity of the obtained polyester film, or strengthen the bonding between polyester and dye—are suggested. However, none of these conventional method can afford sufficient effect, but at least a part or even all of the excellent mechanical properties, physical properties and/or chemical properties of polyester film as described above is deteriorated by lowering of softening point, color change or heterogeneous mixing of said polyester film.

For this reason, several methods are suggested in order to improve dyeability of polyester without separately adding any copolymeric component, but problems still remains in these methods. First, using a dye having relatively small molecular size results in deficient adhesiveness of dye at the time of washing, while adding a carrier in the aqueous dye bath involves increase of production cost. As the process of pretreating with a semi-solvent forms a pretreated molded article having sheath-core structure so that the outer layer can easily absorbs dye to cause heterogeneous dyeing through the direction of thickness. Besides, a solution dyeing method, in which a dye and polyester are mixed in molten state, is suggested. Though the method gives good results, it is not practically useful in manufacturing various products with small scale.

In order to solve the problems of conventional methods mentioned above, the present inventors have continuously performed intensive studies, and as a result, they invented easily dyeable polyester film from polyester homopolymer without separately incorporating copolymeric component, and process for preparing thereof.

SUMMARY OF THE INVENTION

The object of the present invention is to provide easily dyeable polyester film. Another object of the present invention is to provide a process for preparing the easily dyeable polyester film.

The present invention relates to a double-axis elongated polyester film which simultaneously possess properties shown in the following formulas, and a process for the preparation thereof.

$$3.295 \leq N_{MD} + N_{TD} \leq 3.340 \quad (1)$$

$$\text{Benzene plane orientation} \leq 0.740 \quad (2)$$

$$\text{Crystallinity (\%)} \leq 54 \quad (3)$$

$$3 \leq \text{Thermal shrinkage in machine direction(\%)} \leq 7 \quad (4)$$

$$0 \leq \text{Thermal shrinkage (\%) in transverse direction} \leq 3 \quad (5)$$

In the above formulas, $N_{MD}$ is refractive index in machine direction, $N_{TD}$ is refractive index in transverse direction, benzene plane orientation in the cosine squared average of the angle between normals of benzene plane and the film normal direction in polyester double-axis elongated film as satisfying the equation $$\text{Benzene plane orientation} = \frac{1.095 - \left(\frac{N_{ND}^2 - 1}{N_{ND}^2 + 2}\right) \times \left(\frac{\bar{n}^2 + 2}{\bar{n}^2 - 1}\right)}{0.345},$$

wherein $N_{ND}$=refractive index in normal direction to film surface, and $$\bar{n} = \frac{N_{MD} + N_{TD} + N_{ND}}{3}.$$

Crystallinity is defined by the equation:

$$\text{Crystallinity} = \frac{\rho - \rho_a}{\rho_c - \rho_a} \times 100,$$

wherein $\rho_a=1.336$ and $\rho_c=1.457$. Thermal shrinkage is measured at 200° C. for 10 minutes.

DETAILED DISCUSSION OF THE INVENTION WITH PREFERRED EMBODIMENTS

The polyester film of the present invention is prepared by melt-extruding polyester chips and cooling the extrudate in a cooling drum to prepare a non-crystalline sheet; elongating said sheet at a temperature between 80 and 100° C. which is higher than glass transition temperature (Tg) to make 3.0 to 3.6 folds of length in machine direction; further elongating the film to 3.0–4.2 folds of length in transverse direction at 120–140° C.; thermally treating the obtained film in Tenter's thermal treatment zone at 210–240° C. with at least 5 stages; and winding the double-axis elongated film obtained by releasing 0.01–10% of the film in machine and/or transverse direction. The film obtained above must simultaneously satisfy formulas (1) to (5).

In formula (1), the sum of refractive index in machine direction and refractive index in transverse direction of the film ($N_{MD}$+NTD) is preferably 3.295–3.340, more preferably 3.310–3.325; benzene plane orientation of formula (2) is preferably not more than 0.740, more preferably not more than 0.730; and crystallinity of formula (3) is preferably not more than 54%, more preferably not more than 52%. Refractive indexes, benzene plane orientation and crystallinity essentially depend on the manufacturing condition of the film. In order to simultaneously satisfy those values, the elongation rate and the temperature of thermal treatment should be properly controlled during the process for preparation of film. If refractive indexes, face orientation and crystallinity value become too high, the permeation of dye into the film during the dyeing process becomes difficult, so that the color and color concentration of the film cannot reach a predetermined level. On the contrary, if those values are too low, the mechanical properties deteriorate. Formulas (4) and (5) are also related to dyeability, but is more closely related to workability during the dyeing process. If those values are too large or too small, scratch or crease may occur owing to the fraction between the roll of the dye bath and film. The polyester polymer used in the present invention can be obtained by a process comprising the steps of directly esterifying terephthalic acid and ethylene glycol or transesterifying dimethyl terephthalate and ethylene glycol in the presence of a catalyst to give bis(β-hydroxyethyl) terephthalate and/or esterified product thereof, which is low molecular weight condensate; and then continuously polycondensating said product to obtain polyester. Alternatively, polyester can be prepared by polycondensating ethylene glycol ester of terephthalic acid. The desirable inherent viscosity of polyester in o-chlorophenol solution at 25° C. is 0.5 to 0.7.

Polyester of the present invention may contain inert microparticles which can act as a lubricant, if required. The content of the inert microparticles may be usually 0.001–2 part by weight based on the weight of polyester, and average particle size 0.005–8.0 µm.

Microparticles usable in the present invention include particles added from outside such as high-melting organic compounds produced during polyester melting stage or film formation stage, cross-linked polymer particles, organometallic (alkali metal or alkaline earth metal) compounds used in polyester synthesis, so-called internal deposited particles which are formed inside the polymer during the preparation of polyester, calcium carbonate ($CaCO_3$), Silica ($SiO_2$), magnesium oxide (MgO), zinc oxide (ZnO), magnesium carbonate ($MgCO_3$), barium sulfate ($BaSO_4$), alumina ($Al_2O_3$), titanium oxide ($TiO_2$), kaolin and clay.

If desired, additives such as polyfunctional cross-linking agent such as trimellitic acid, trimesinic acid, pyromellitic acid, trimethylol propane, glycerine, pentaerythritol, or the like, terminal group capturer such as monomethoxy polyethylene glycol, stearyl alcohol, palmitic acid, benzoic acid, naphtoic acid, UV absorbent, inhibitor for generation of diethylene glycol, anti-static agent, electric conductor, magnetic material, anti-oxidant, anti-foaming agent or fluorescent bleaching agent may be added to polyester.

The method for obtaining polyester film by the present invention can improve dyeability of polyester film without separately adding any copolymeric component,

PREFERRED EMBODIMENTS OF THE INVENTION

Now, The present invention is described with reference to Examples below. However, it should not be noted that the present invention is restricted to those examples.

Properties of film were measured and evaluated as follows:

[Evaluation of film properties]

(1) Refractive index in machine direction($N_{MD}$) and refractive index in transverse direction($N_{TD}$)

Refractive indices were measured by using Abbe refractometer with sodium D line at 23±2° C.

(2) Benzene plane orientation

Benzene plane orientation is obtained from the equation below [Polymer Engineering and Science, Mid-November, 1989, Vol. 29, No. 21, pp 1534–1543]:

$$\text{Benzene plane orientation} = \frac{\text{the cosine squared average of the angle between normals of benzene planes and the film normal direction in double-axis elongated polyester film}}{} = \frac{1.095 - \left(\frac{N_{ND}^2 - 1}{N_{ND}^2 + 2}\right) \times \left(\frac{\bar{n}^2 + 2}{\bar{n}^2 - 1}\right)}{0.345},$$

wherein $$\bar{n} = \frac{N_{MD} + N_{TD} + N_{ND}}{3}$$

($N_{MD}$=refractive index in machine of the film, $N_{TD}$=refractive index in transverse direction of the film, and $N_{ND}$=refractive index in normal direction of the film).

(3) Crystallinity(%)

Density of film is determined by using a density gradient column comprising n-heptane and carbon tetrachloride, and crystallinity is defined by the equation:

$$\text{Crystallinity} = \frac{\rho - \rho_a}{\rho_c - \rho_a} \times 100, \text{ wherein } \rho_a = 1.336 \text{ and } \rho_c = 1.457.$$

(3) Thermal shrinkage (%)

A test sample [20 cm (length)×1 cm (width)] is taken from film. Thermal shrinkage of the sample is measured at 200° C. for 10 minutes by free weight thermal treatment in a hot-air oven.

[Evaluation of dyeability]

In order to evaluate dyeability of polyester, 0.5 part by weight of Miketone FBL Blue [produced by Mitsui Toatsu, Japan], a dispersive dye for polyester, was dispersed in distilled water, and the dye solution was heated to 96° C., and then the sample of polyester film was soaked in the solution for 1 hour. After sufficiently washing with distilled water, the dyeability of the same was evaluated.

(1) Color tone

Color tone was designated by a value, measured by using a calorimeter. Plus a (+a) shows yellow color, while -a shows blue color. When using the above dye solution, the larger is -a value, the easier is dyeing.

(2) Color density

Color density was measured by using a color densitometer [produced by Macbeth Division of Kollmorgen Instrument Co.]. The higher is the value, the better is dyeability.

EXAMPLE 1

(Preparation of polyester chips)

Dimethyl terephthalate (1700 parts), ethylene glycol (900 parts), magnesium acetate tetrahydrate (2.4 parts), and amorphous silica having average particle size of 1.4 $\mu$m (9.0 parts), which had been well dispersed in ethylene glycol at a concentration of 6%, were placed in a transesterification reactor, and the mixture was heated with stirring. At about 140° C., methanol was produced as transesterification proceeded. The reaction was continued by elevating the reaction temperature to 230° C. for 4 hours as removing produced methanol to obtain esterified product. After sufficiently removing methanol, trimethyl phosphate solution (12.05 parts by weight) in ethylene glycol (10 parts by weight) was added thereto, and the mixture was stirred for about 10 minutes. After adding antimony oxide ($Sb_2O_3$) slurry (10.8 parts by weight), which had been separately well-dispersed in ethylene glycol at a concentration of 5%, the reaction mixture was transferred to a polycondensation reactor. As slowly elevating the temperature of reaction mixture in the reactor, the pressure was lowered. The pressure in the reactor was lowered within one hour, and finally the pressure reaches high vacuum of 0.8–0.9 torr, and the temperature 285±1° C., and then the polycondensation was performed for about 4 hours. When a certain viscosity was obtained in the process of polycondensation, the reaction product was extruded into cooling water through the nozzle in the bottom of the reactor to make spaghetti-like product. The product was cut in a certain length to obtain polyester having inherent viscosity [$\mu$] of 0.615 as chips.

(Preparation of polyester film)

Polyester chips obtained above were sufficiently dried at 160° C., and melt-extruded through extrusion die at 295° C. The extrudate was rapidly cooled by a pinning method using electrostatic application on a cooling drum at 20° C. to form an amorphous sheet having a crystallinity not more than 5%. The obtained sheet was elongated to 3.2-fold length in machine direction at 80–100° C. to give single-axis elongated film, and then elongated to 4.1-fold length in transverse direction at 120–140° C. The elongated film was thermally treated in a thermal treatment zone having 5 or more divided stages at a temperature between 210° C. and 240° C., and then subjected to 5.5% of release to obtain double-axis elongated polyester film having 23 $\mu$m of thickness.

The results are summarized in Table 1.

EXAMPLE 2

(Preparation of polyester chips)

In a reactor equipped with a stirrer and a rectifier, terephthalic acid (1550 parts by weight), ethylene glycol (695 parts by weight) and 10% aqueous TEAH (tetraethylammonium hydroxide) solution (5.4 parts by weight) were placed, and the mixture was heated to 245° C. under 1.8 kg/cm$^2$ of pressure. While maintaining the same temperature for 4 hours, water, the reaction product, was removed to perform a direct esterification to obtain esterified product having esterification ratio of 97%.

After adding antimony anhydride ($Sb_2O_3$) slurry (10.8 parts by weight), which had been separately well-dispersed in ethylene glycol at a concentration of 5 parts by weight, trimethyl phosphate (12.05 parts by weight) dissolved in ethylene glycol (10 parts by weight), and calcium acetate monohydrate (1.35 parts by weight) dissolved in ethylene glycol (5 parts by weight), the reaction mixture was stirred for 10 minutes and transferred to a polycondensation reactor.

Then, amorphous silica having average particle size of 1.4 $\mu$m (18.0 parts), which had been separately well-dispersed in ethylene glycol at a concentration of 6 parts by weight was added to the polycondensation reactor, and the temperature of the reactants was slowly elevated with decreasing the pressure over 1 hour to reach final pressure of 0.8 to 0.9 torr. The final temperature of 290° C. of the polycondensation reactor was maintained during about 3 hours of polycondensation reaction. Once a certain viscosity is obtained, the reaction product was extruded into cooling water through the nozzle in the bottom of the reactor to make spaghetti-like product. The product was cut in a certain length to obtain polyester chips.

(Preparation of polyester film)

Polyester film was prepared by the same procedures as described in Example 1, but the sheet was elongated to 3.4-fold length in machine direction and 4.04-fold length in transverse direction.

The results are summarized in Table 1.

EXAMPLE 3

(Preparation of polyester chips)

The procedures described in Example 2 were carried out, except that calcium acetate monohydrate was not added, but a slurry (21.6 parts by weight) of cross-linked organic polymer particles having 0.5 $\mu$m of average particle size and 105° C. of glass transition temperature (Tg) [produced by Soken Chemical and Engineering Co. Ltd, Japan; MP-5500; copolymer of polystyrene and polymethyl methacrylate] dispersed in ethylene glycol (10 parts by weight), and a solution (19.3 parts by weight) of K-methyl trimellitate (Korean Patent Application No. 95-29177) as a partially esterified trimellitate dissolved in ethylene glycol (10 parts by weight) were added.

K-methyl trimellitate was prepared as follows:

Trimellitic anhydride (19.21 parts) and methanol (130 parts) were placed in a reactor, and the mixture was heated under reflux for 5 hours. The reaction mixture was cooled to room temperature. Upon adding potassium carbonate ($K_2CO_3$) (13.82 parts) and distilled water (60 parts) thereto, carbon dioxide ($CO_2$) gas was generated with forming precipitates. The reaction mixture was filtered, washed several times with acetone, and dried carefully in an drying oven for 1 day to obtain K-methyl trimellitate.

(Preparation of polyester film)

Polyester film was prepared by the same procedures as described in Example 2.

The results are summarized in Table 1.

EXAMPLE 4

(Preparation of polyester chips)

The same procedures described in Example 2 were carried out, but amorphous silica (9.0 parts by weight) was added.

(Preparation of polyester film)

Polyester film was prepared by the same procedures as described in Example 2, but the temperature of thermal treatment was 210–280° C.

The results are summarized in Table 1.

Comparative Example 1

(Preparation of polyester chips)

The same procedures described in Example 4 were carried out.

(Preparation of polyester film)

Polyester film was prepared by the same procedures as described in Example 1, but the sheet was elongated to 3.8-fold length in machine direction and 4.3-fold length in transverse direction, and the temperature of thermal treatment was 210–230° C.

The results are summarized in Table 1.

Comparative Example 2

(Preparation of polyester chips)

The same procedures described in Example 4 were carried out.

(Preparation of polyester film)

Polyester film was prepared by the same procedures as described in Comparative Example 1, but the temperature of thermal treatment was 215–245° C.

The results are summarized in table 1.

$$\frac{1.095 - \left(\frac{N_{ND}^2 - 1}{N_{ND}^2 + 2}\right) \times \left(\frac{\bar{n}^2 + 2}{\bar{n}^2 - 1}\right)}{0.345},$$

wherein, $N_{ND}$=refractive index in normal direction to the film surface, and $$\bar{n} = \frac{N_{MD} + N_{TD} + N_{ND}}{3},$$

crystallinity(%) is, $$\frac{\rho - \rho_a}{\rho_c - \rho_a} \times 100,$$

and thermal shrinkage is measured at 200° C. for 10 minutes.

2. A double-axis elongated polyester film for dyeing according to claim 1, wherein inert microparticles are contained.

3. A double-axis elongated polyester film for dyeing according to claim 1, wherein the sum of refractive index in machine direction and refractive index in transverse direction($N_{MD}+N_{TD}$) is between 3.295 and 3.340.

4. A double-axis elongated polyester film for dyeing according to claim 3, wherein the sum of refractive index in

TABLE 1

| | Property of film | | | | | | | | | |
|---|---|---|---|---|---|---|---|---|---|---|
| | | | | | | | thermal shrinkage (%) | | after Dyeing | |
| classification | $N_{MD}$ | $N_{TD}$ | $N_{ND}$ | $N_{MD} + N_{TD}$ | $\bar{n}$ | face orientation | crystallinity (%) | machine direction | transverse direction | a | color concentration |
| Example 1 | 1.6486 | 1.6721 | 1.4981 | 3.3207 | 1.60880 | 0.71075 | 49.0 | 6.0 | 1.9 | −38.02 | 0.20 |
| Example 2 | 1.6574 | 1.6665 | 1.5009 | 3.3239 | 1.60827 | 0.70560 | 52.1 | 4.7 | 0.6 | −42.33 | 0.22 |
| Example 3 | 1.6560 | 1.6641 | 1.4920 | 3.3201 | 1.60403 | 0.72911 | 47.5 | 3.2 | 0.4 | −41.88 | 0.22 |
| Example 4 | 1.6581 | 1.6646 | 1.4973 | 3.3227 | 1.60667 | 0.71512 | 51.3 | 5.7 | 2.2 | −37.13 | 0.19 |
| Comparative example 1 | 1.6421 | 1.6989 | 1.4910 | 3.3410 | 1.61066 | 0.72982 | 56.4 | 2.5 | 0.2 | −28.08 | 0.11 |
| Comparative example 2 | 1.6467 | 1.6949 | 1.4891 | 3.3416 | 1.61023 | 0.74213 | 55.2 | 2.2 | 0 | −26.49 | 0.10 |

What is claimed is:

1. A double-axis elongated polyester film for dyeing, having properties which simultaneously satisfy the following formulas:

$3.295 \leq N_{MD}+N_{TD} \leq 3.340$     (1)

Benzene plane orientation $\leq 0.740$     (2)

Crystallinity (%) $\leq 54$     (3)

$3 \leq$ Thermal shrinkage in machine direction(%) $\leq 7$     (4)

$0 \leq$ Thermal shrinkage in transverse direction(%) $\leq 3$     (5)

wherein, $N_{MD}$ is refractive index in machine direction of the film, $N_{TD}$ is refractive index in transverse direction of the film, benzene plane orientation is machine direction and refractive index in transverse direction($N_{MD}+N_{TD}$) is between 3.310 and 3.325.

5. A double-axis elongated polyester film for dyeing according to claim 1, wherein the benzene plane orientation is between 0.500 and 0.740.

6. A double-axis elongated polyester film for dyeing according to claim 5, wherein the benzene plane orientation is between 0.600 and 0.730.

7. A process for preparing double-axis elongated polyester film which comprises the steps of melt-extruding polyester chips and cooling the extrudate in a cooling drum to prepare a non-crystalline sheet; elongating said sheet at a temperature between 80 and 100° C. which is higher than glass transition temperature (Tg) to make 3.0 to 3.6 folds of length in machine direction to obtain single-axis elongated film; further elongating said single-axis elongated film to 3.0–4.2 folds of length in transverse direction at 120–140° C.; thermally treating the obtained film in Tenter's thermal treatment zone at 210–240° C. with at least 5 stages; and rolling the double-axis elongated film obtained by releasing 0.01–10% of the film in machine and/or transverse direction, to provide a double-axis elongated polyester film which has properties which simultaneously satisfies the following formulas:

$$3.295 \leq N_{MD}+N_{TD} \leq 3.340 \quad (1)$$

$$\text{Benzene plane orientation} \leq 0.740 \quad (2)$$

$$\text{Crystallinity (\%)} \leq 54 \quad (3)$$

$$3 \leq \text{Thermal shrinkage in machine direction(\%)} \leq 7 \quad (4)$$

$$0 \leq \text{Thermal shrinkage in transverse direction(\%)} \leq 3 \quad (5)$$

wherein, $N_{MD}$ is refractive index in machine direction of the film, $N_{TD}$ is refractive index in transverse direction of the film, benzene plane orientation is $$\frac{1.095 - \left(\frac{N_{ND}^2-1}{N_{ND}^2+2}\right) \times \left(\frac{\bar{n}^2+2}{\bar{n}^2-1}\right)}{0.345},$$

wherein, $N_{ND}$=refractive index in normal direction to the film surface, and $$\bar{n} = \frac{N_{MD}+N_{TD}+N_{ND}}{3},$$

crystallinity(%) is, $$\frac{\rho-\rho_a}{\rho_c-\rho_a} \times 100,$$

and thermal shrinkage is measured at 200° C. for 10 minutes.

* * * * *